United States Patent [19]
Baker

[11] 3,752,127
[45] Aug. 14, 1973

[54] LEASH FOR AN ANIMAL

[76] Inventor: Calvert W. Baker, R.D. No. 2, Buffalo St. Ext., Jamestown, N.Y. 14701

[22] Filed: Nov. 8, 1971

[21] Appl. No.: 196,678

[52] U.S. Cl. .............................................. 119/109
[51] Int. Cl. ............................................. A01k 03/00
[58] Field of Search .................. 119/109, 106, 126; 54/34

[56] References Cited
UNITED STATES PATENTS

| 2,861,547 | 11/1958 | Dale ..................................... | 119/109 |
| 977,547 | 12/1910 | Read ..................................... | 119/126 |
| 950,470 | 3/1910 | Bellamy ............................... | 54/34 |

Primary Examiner—Hugh R. Chamblee
Attorney—Charles L. Lovercheck

[57] ABSTRACT

A leash for an animal. The leash is made of a strap that is bent back on itself at each end, forming a loop at each end, and a snap is placed in each loop. The snap has a rounded part through which the strap passes. The rounded part is slightly lesser in diameter than the width of the strap whereby the snaps deform the strap and hold the strap in position. The ends of the strap each pass through a buckle where the loop is held intact. A keeper is formed at one end of the strap between the buckle and the strap and a D-shaped ring is supported on the end of the strap adjacent the keeper between the keeper and the buckle. This ring can receive the second snap. The first snap can be snapped into the collar of a dog or the like to lead the dog. Thus the second loop formed is considerably larger than the first loop and forms a convenient hand-receiving handle. A person can pass his forearm through the large loop, or it could be placed over a fence post or other anchoring means to restrain the dog. The dog can be lead on a short effective leash by snapping the second snap into the ring and snapping the first snap into the dog's collar.

2 Claims, 4 Drawing Figures

PATENTED AUG 14 1973 3,752,127
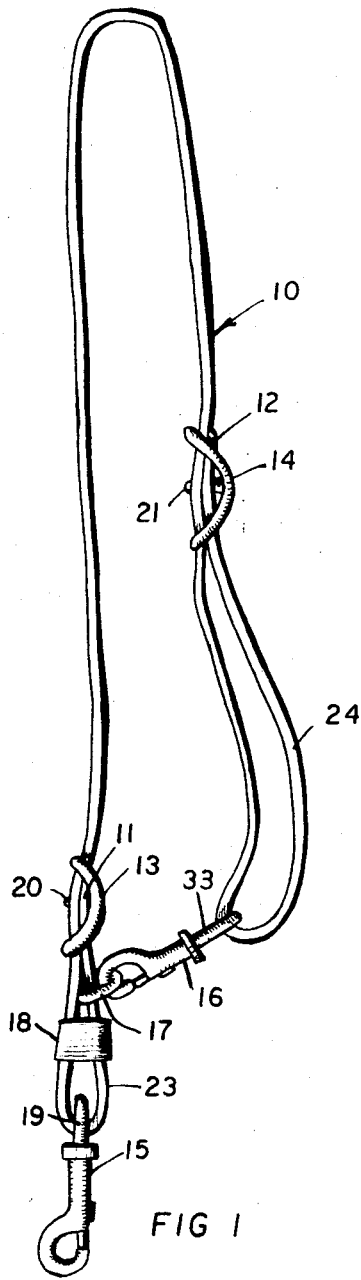
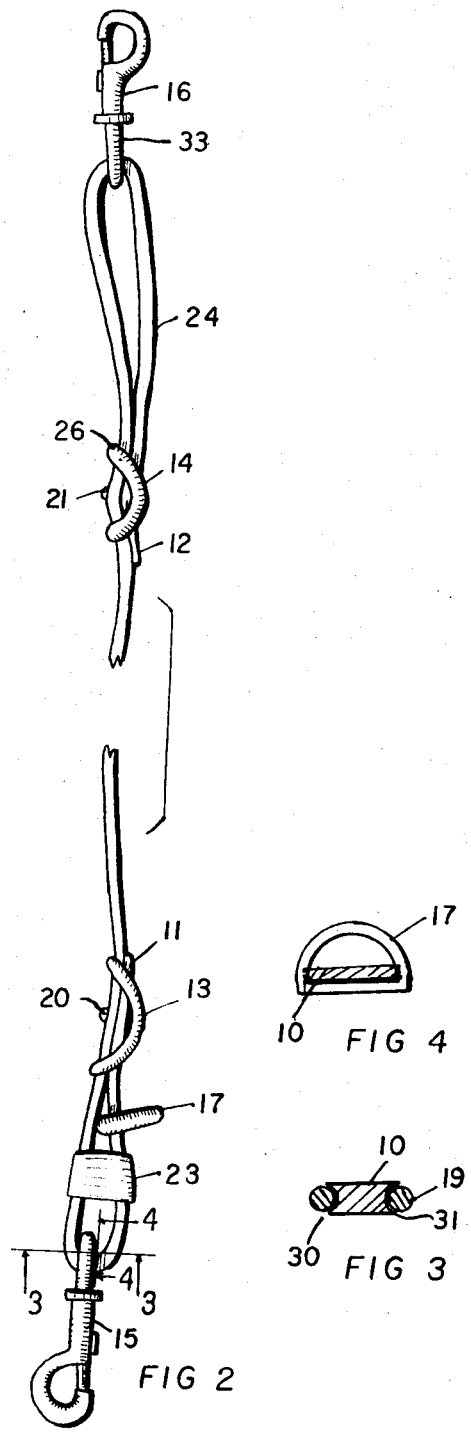
INVENTOR.
CALVERT W. BAKER
BY
Charles L. Lovercheck
attorney

LEASH FOR AN ANIMAL

OBJECTS OF THE INVENTION

It is an object of the invention to provide an improved leash.

Another object is to provide a leash that can have any part thereof replaced without replacing any other part.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction, without departing from the spirit or sacrificing any of the advantages of the invention.

DESCRIPTION OF THE DRAWINGS

FIG. 1 is a side view of the leash according to the invention, with the leash connected for short effective length.

FIG. 2 is a side view of the leash extended for maximum length.

FIG. 3 is a bottom cross sectional view of the ring according to the invention taken on line 3—3 of FIG. 2.

FIG. 4 is a cross sectional view of the ring taken on line 4—4 of FIG. 2.

DETAILED DESCRIPTION OF THE DRAWINGS

The drawings show a leash according to the invention. The leash is made up of a strap 10 which may be of leather, plastic or the like, having a first end 11 and a second end 12. The strap is relatively thin, flat and rectangular in cross section. The strap has a first buckle 13 and a second buckle 14, a first snap 15, and a second snap 16, a ring 17, and a keeper 18. Each snap 15 has a relatively round D-shaping portion 19, which is connected by a swivel connection to the snap. Snap 16 has rounded part 33. The rounded portions 19 and 33 are D-shaped, as indicated in FIG. 4. The ring 17 is D-shaped and the straight side of the D is disposed between the end 11 and the other part of the strap. The keeper 18 has a rectangular opening and it receives the bight portion 23 of the strap between the holes which receive the buckle tongue 20. The bight portion 24 is received between the loop portions 26 of buckle 14. The tongue 21 on the buckle 14 is likewise received in the holes in that portion of the strap. The swivel connecting snap 16 to ring 33 in FIG. 1 will allow the snap to straighten itself out if the strap becomes twisted. Ends 11 and 12 may be removed at any time to replace snaps 15 or 16 or to replace buckles 13 or 14. The strap 10 itself can be replaced at any time by removing all the hardware. The D-shaped strap receiving parts 19 and 30 of the snaps indent the strap as shown in FIG. 3 at 30 and 31 and, therefore, prevent the snaps from slipping on the strap 10.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A leash for an animal comprising, a flat relatively thin strap having a first end and a second end, a first snap and a second snap, a first buckle and a second buckle, a ring, and a keeper, each said snap having a D-shaped portion for receiving said strap, said first end of said strap passing through said first buckle, through said keeper, through said D-shaped portion of said first snap, back through said keeper, through said ring and through said first buckle, said first end of said strap having a first hole spaced from the end with a second hole adjacent said first end, said first buckle having a tongue fixed to it and passing through said holes in said first end of said strap forming a loop when said strap is bent back on itself, holding said loop in said first strap, said second end of said strap passing through said second buckle, through said D-shaped portion of said second snap, back through said second buckle, providing a hand receiving loop, said second end of said strap having a first hole adjacent the extreme end and a second hole in said strap overlying said first hole in said second end, said second buckle having a tongue fixed to it and passing through said first hole in said second end and said hole overlying it, said second end of said strap being bent back on itself forming a loop where it passes through said second buckle and said D-shaped portions of said snaps being slightly lesser in diameter than the width of said strap whereby said D-shaped portion of said snaps deform said strap and hold said snaps in position.

2. The leash recited in claim 1 wherein said buckle tongues are rigidly fixed to said buckles.

* * * * *